J. T. Warren.
Fruit Picker.
N° 86,333. Patented Jan. 26, 1869.

Witnesses:
Geo. A. Gage
Ja. Lorenzo Gage

Inventor:
J. T. Warren

J. T. WARREN, OF LE ROY, NEW YORK.

*Letters Patent No. 86,333, dated January 26, 1869.*

IMPROVEMENT IN FRUIT-PICKER.

The Schedule referred to in these Letters Patent and making part of the same.

*To all whom it may concern:*

Be it known that I, J. T. WARREN, of Le Roy, State of New York, have invented a new and useful Fruit-Picker; and I do hereby declare that the following is a full, clear, and exact description thereof, reference being had to the accompanying drawing, making part of this specification, in which—

The nature of my invention will be understood from the drawings and specifications.

To enable others skilled in the art to make and use my invention, I will describe its construction and operation.

On the side of the jaw A, of a common square-jawed plier, I fasten a plate, $a$, which has a sharp edge, and extends beyond the edge of the other jaw, $d$, when the two are pressed together.

This plate, in its combined action with the opposite jaw, forms a pair of shears.

Figure 1:
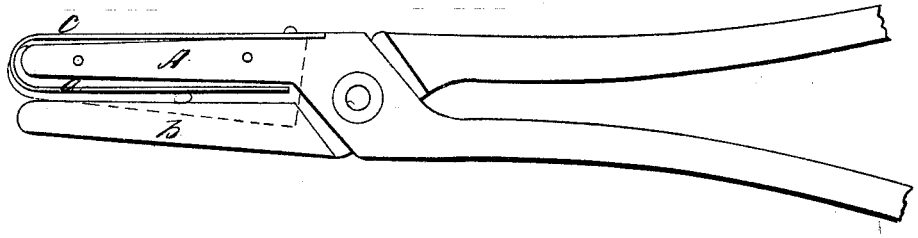
Figure 1 is a side elevation, showing the arrangement of the spring $c$.

On the jaw A, I fasten a spring, $c$, which is riveted to the rear end of the outside of the jaw, and extends around the outer end, and back to the rear part of the jaw on the inside, as shown in fig. 1.

The object of this invention is to make a device for gathering grapes and other fruit, and at the same time holding it until the operator can place it where it may be desired.

Figure 2:
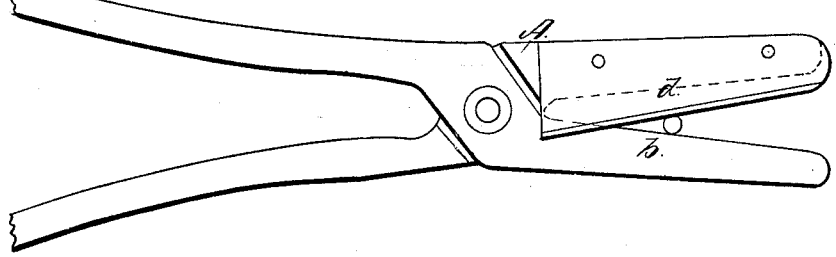
Figure 2 is a side elevation, showing the shear-plate $a$.

The operation is as follows:

The jaws are extended to receive the stem of the fruit between the spring and the opposite jaw, the side shown in fig. 2 being next to the parent stem. As the jaws are being closed, the spring presses on the stem of the fruit, and holds it until after the knife-edge of the plate $a$ cuts it off.

The fruit cannot fall out, as the spring and opposite jaw hold it until relieved by the operator.

The spring being attached at the rear end of the jaw, on the outside, and being loose at the outer end of the jaw, allows it to yield, so that the vine will be easily clasped at any point along the whole length of the jaw.

The spring serves to clean the side of the plate $a$ as the jaws open, and it also serves to open the jaws.

The sharp edge of the plate $a$ and jaws may be made in one piece, but I prefer making them separate, so that a new plate can be put on when one is worn away.

What I claim as my invention, and desire to secure by Letters Patent, is—

The fruit-picker, composed of the two-handled jaws A and $b$, cutting-blade $a$, and the spring-holder $c$, when the latter also acts as the opener for the jaws of the instrument, for the purposes herein set forth.

J. T. WARREN.

Witnesses:
GEO. A. GAGE,
J. L. GAGE.